(12) United States Patent
Tsuruta et al.

(10) Patent No.: US 7,030,588 B2
(45) Date of Patent: Apr. 18, 2006

(54) CONTROL CONSTANT ADJUSTING APPARATUS

(75) Inventors: Kazuhiro Tsuruta, Fukuoka (JP); Nobuhiro Umeda, Fukuoka (JP); Keisei Inoki, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 49 days.

(21) Appl. No.: 10/508,216

(22) PCT Filed: Dec. 10, 2002

(86) PCT No.: PCT/JP02/12915

§ 371 (c)(1), (2), (4) Date: Sep. 20, 2004

(87) PCT Pub. No.: WO03/079533

PCT Pub. Date: Sep. 25, 2003

(65) Prior Publication Data
US 2005/0116677 A1 Jun. 2, 2005

(30) Foreign Application Priority Data
Mar. 20, 2002 (JP) .............................. 2002-079563
Aug. 2, 2002 (JP) .............................. 2002-226096

(51) Int. Cl.
*H02P 1/24* (2006.01)

(52) U.S. Cl. ...................... 318/727; 318/807; 318/432; 318/434; 318/610; 318/611

(58) Field of Classification Search ........ 318/432–434, 318/800, 807, 610, 611, 632, 621, 652
See application file for complete search history.

(56) References Cited

U.S. PATENT DOCUMENTS

| 5,467,004 | A | * | 11/1995 | Matsuo et al. ............... 318/807 |
| 5,710,498 | A | * | 1/1998 | Yutkowitz et al. .......... 318/632 |
| 5,886,491 | A | * | 3/1999 | Yoshida et al. ............. 318/592 |
| 6,252,369 | B1 | * | 6/2001 | Kaku et al. ................. 318/609 |
| 6,272,410 | B1 | * | 8/2001 | Okanoue et al. ............. 701/42 |
| 6,274,994 | B1 | * | 8/2001 | Tsutsui ....................... 318/560 |
| 6,566,837 | B1 | * | 5/2003 | Zhang et al. ................ 318/610 |

FOREIGN PATENT DOCUMENTS

JP          10-178793 A      6/1998

(Continued)

*Primary Examiner*—Rina Duda
(74) *Attorney, Agent, or Firm*—Sughrue Mion, PLLC

(57) ABSTRACT

A control constant adjusting apparatus in a control apparatus of a robot or a machine tool, etc. is disclosed. This control constant adjusting apparatus includes a speed control part (12), an estimation part (13), an identification part (14) and an adjustment part (15). The identification part (14) makes identification of inertia J obtained from a ratio between a value |SFTr| in which an absolute value |FTr| of a value FTr obtained by passing a torque command Tref of the speed control part (12) through a predetermined high-pass filter is integrated with respect to time at a predetermined interval [a, b] and a value |SFTr'| in which an absolute value |Ftr'| of a value FTr' obtained by passing a model torque command Tref' of the estimation part (13) through a predetermined high-pass filter is integrated with respect to time at the same interval only when a speed Vfb' of a model in the estimation part (13) matches with a motor speed Vfb in the speed control part (12) at a value other than zero.

6 Claims, 8 Drawing Sheets

FOREIGN PATENT DOCUMENTS

| | | |
|---|---|---|
| JP | 11-89267 A | 3/1999 |
| JP | 3185857 B2 | 5/2001 |
| JP | 2001-218488 A | 8/2001 |
| JP | 2001-238477 A | 8/2001 |
| WO | WO 98/28837 A1 | 7/1998 |

* cited by examiner

CONTROL CONSTANT ADJUSTING APPARATUS

TECHNICAL FIELD

The present invention relates to a control constant adjusting apparatus having a function of identifying an inertial and adjusting a gain of a control system required along with the identification particularly in the case that variation occurs in inertia of a load during the operation in a control apparatus of a robot or a machine tool, etc.

BACKGROUND ART

Conventionally, in the case that variation occurs in inertia of a load which is a controlled object during operation of a motor, as an apparatus for identifying its inertia, for example, there is a control constant adjusting apparatus in Japanese Patent No. 3,185,857 proposed by the present applicant.

This apparatus includes a speed control part for determining a torque command so that an actual motor speed matches with a speed command inputted and controlling the motor speed, an estimation part for simulating the speed control part so that a speed of a model matches with the motor speed and an identification part for identifying inertia from a ratio between a value in which an absolute value of a value obtained by passing the torque command through a predetermined high-pass filter is integrated with respect to time at a predetermined interval and a value in which an absolute value of a value obtained by passing a model torque command of the estimation part through a predetermined high-pass filter is integrated with respect to time at the same interval, and is characterized in that the inertia is identified in the identification part only when the speed of the model in the estimation part matches with the motor speed in the speed control part at a value other than zero.

Since this apparatus can make identification in real time with respect to an arbitrary speed command, the identification can be made even when inertia of a load changes momentarily.

In the conventional control constant adjusting apparatus described above, when the speed control part is constructed by proportional integral control (hereinafter called PI control), constant disturbance such as gravity can be compensated by an integrator in the speed control part in a steady state, so that a speed deviation can be substituted for torque necessary to perform driving actually and there is no problem, but when the speed control part is constructed by integral proportional (hereinafter called IP control) control, a torque component necessary to perform driving actually cannot be separated from a torque component necessary to compensate disturbance, so that in this IP control, a problem that inertia cannot be identified arises.

Also, in the conventional control constant adjusting apparatus described above, the motor speed is set as a speed command of a model speed control part, so that there is a problem that delay in a model speed control system occurs and it takes time to reach identification since a model motor speed is difficult to match with the motor speed. Further, when there is load disturbance such as mechanical vibration or friction, the amount of compensation of the load disturbance is summed in a speed integral value in the actual speed control part, but it is difficult to reflect this amount of compensation of the load disturbance in a model. In the conventional art, processing for passing torque commands through the high-pass filter to sum the torque commands is performed, but there are cases where the high-pass filter does not work effectively depending on a frequency of disturbance and there is a problem that accuracy of identification becomes worse.

DISCLOSURE OF THE INVENTION

An object of the invention is to provide a control constant adjusting apparatus capable of surely identifying inertia in any case that speed control is PI control or IP control and implementing tuning with high accuracy of identification in real time even in a vibration system like a two-inertia system.

According to a first aspect of the invention, a control constant adjusting apparatus includes a command generation member for outputting a speed command Vref; a speed control member for determining a torque command Tref so that an actual motor speed Vfb matches with the speed command Vref and controlling the motor speed by the torque command; an estimation member for simulating the speed control member so that a speed Vfb' of a model matches with the motor speed Vfb; an identification member for making identification of inertia J obtained from a ratio between a value |SFTr| in which an absolute value |FTr| of a value FTr obtained by passing the torque command Tref of the speed control member through a predetermined high-pass filter is integrated with respect to time at a predetermined interval [a, b] and a value |SFTr'| in which an absolute value |FTr'| of a value FTr' obtained by passing a model torque command Tref' of the estimation member through a predetermined high-pass filter is integrated with respect to time at the same interval only when the speed Vfb' of the model in the estimation member matches with the motor speed Vfb in the speed control member at a value other than zero; and an adjustment member for adjusting a control gain based on a ratio J/J' between the inertia J identified in the identification member and inertia J' in the estimation member.

Identification of inertia J obtained from a ratio between a value |SFTr| in which an absolute value |FTr| of a value FTr obtained bypassing the torque command Tref of the speed control member through a predetermined high-pass filter is integrated with respect to time at a predetermined interval [a, b] and a value |SFTr'| in which an absolute value |FTr'| of a value FTr' obtained by passing a model torque command Tref' of the estimation member through a predetermined high-pass filter is integrated with respect to time at the same interval is made only when the speed Vfb' of the model in the estimation member matches with the motor speed Vfb in the speed control member at a value other than zero. As a result of this, in any case that speed control is PI control or IP control, the identification of inertia can be made surely and also stable tuning can be performed even in a vibration system like a two-inertia system and further an influence of constant disturbance is not suffered, so that tuning with high accuracy of identification can be implemented in real time.

According to a second aspect of the invention, a control constant adjusting apparatus includes a command generation member for outputting a speed command Vref; a speed control member for inputting the speed command Vref and an actual motor speed Vfb and calculating a speed deviation Ve by subtracting the actual motor speed Vfb from the speed command Vref and calculating a speed proportional integral value by adding an integral term for calculating a speed integral value by integrating the speed deviation Ve with respect to an integral time constant Ti to a proportional term for calculating a speed proportional value by subtracting the motor speed Vfb from a value in which the speed command Vref is multiplied by a predetermined constant α (α≧0) and determining a torque command Tref by multiplying the speed proportional integral value by an inertia estimation value J for estimating a total value of a motor inertia value Jm and a load inertia value JL and controlling the motor speed by the torque command; an estimation member for simulating the speed control member so that a speed Vfb' of a model matches with the motor speed Vfb; an identification member for providing a feedforward compensation function for adding the speed proportional integral value in the speed control member to a model speed proportional integral value similarly computed in the estimation member and setting the speed proportional integral value to a new model speed proportional integral value, and making identification of inertia J obtained from a ratio between a value |SFTr| in which an absolute value |FTr| of a value FTr obtained by passing the torque command Tref of the speed control member through a predetermined high-pass filter is integrated with respect to time at a predetermined interval [a, b] and a value |SFTr'| in which an absolute value |FTr'| of a value FTr' obtained by passing a model torque command Tref' of the estimation member through a predetermined high-pass filter is integrated with respect to time at the same interval; and an adjustment member for adjusting a control gain based on a ratio J/J' between the inertia estimation value J identified in the identification member and inertia J' in the estimation part.

By inputting a feedforward signal from the speed control member to the estimation member, a model speed tends to match with an actual speed and also when there is load disturbance, its influence can be considered. Therefore, an identification error is small and time taken to converge on a true value is short, so that tuning with high accuracy of identification can be implemented in real time.

BEST MODE FOR CARRYING OUT THE INVENTION

Figure 1:
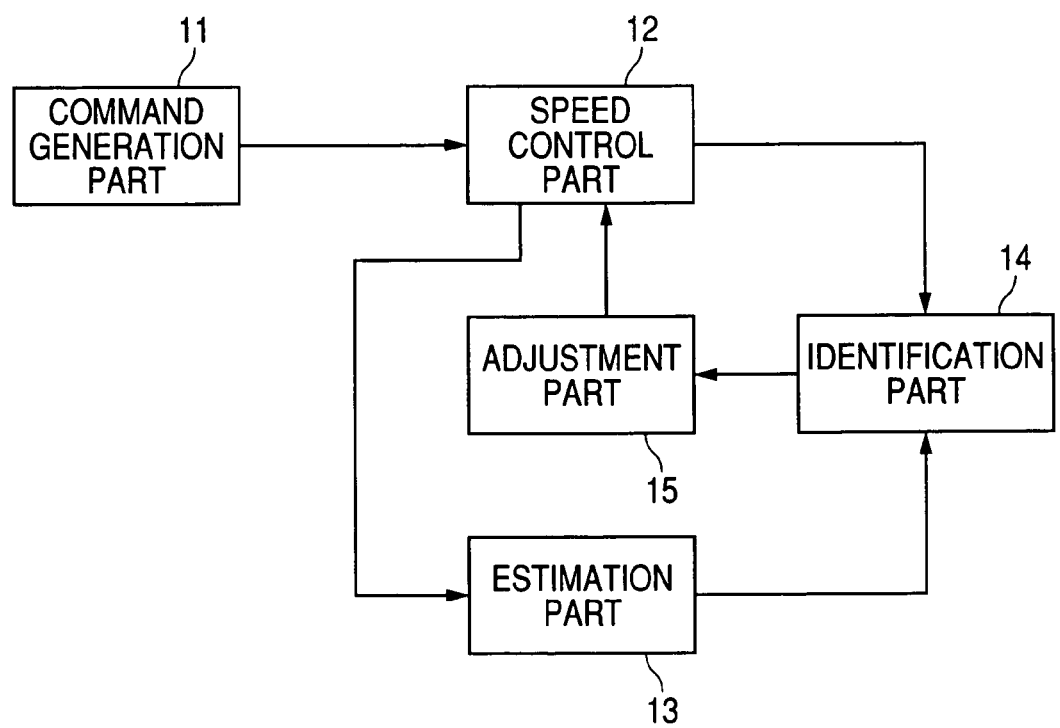
FIG. 1 is a block diagram of a control constant adjusting apparatus according to a first embodiment of the invention.

Referring to FIG. 1, a control constant adjusting apparatus of a first embodiment of the invention includes a command generation part 11, a speed control part 12, an estimation part 13, an identification part 14 and an adjustment part 15.

The command generation part 11 outputs a speed command Vref to the speed control part 12.

The speed control part 12 performs speed control so that a motor speed Vfb matches with the inputted speed command Vref, and outputs a torque command Tref and the motor speed Vfb to the identification part 14, and also outputs the motor speed Vfb to the estimation part 13.

The estimation part 13 performs speed control so that a model speed Vfb' estimated by using a motor model in this estimation part 13 matches with the motor speed Vfb inputted as a target command, and outputs a model torque command Tref' and the model speed Vfb' to the identification part 14.

The identification part 14 obtains an inertia ratio J/J' between a motor and the motor model using the torque command Tref and the motor speed Vfb inputted from the speed control part 12 and the model torque command Tref' and the model speed Vfb' inputted from the estimation part 13, and outputs its inertia ratio J/J' to the adjustment part 15.

The adjustment part 15 is constructed so that this inertia ratio J/J' is received and based on a value obtained by passing the inertia ratio through a predetermined filter, an integral gain Ki and a proportional gain Kv in the speed control part 12 are determined and also a value of an integrator 12c in the speed control part 12 is adjusted and variation in the inertia described above can be handled.

Figure 2:
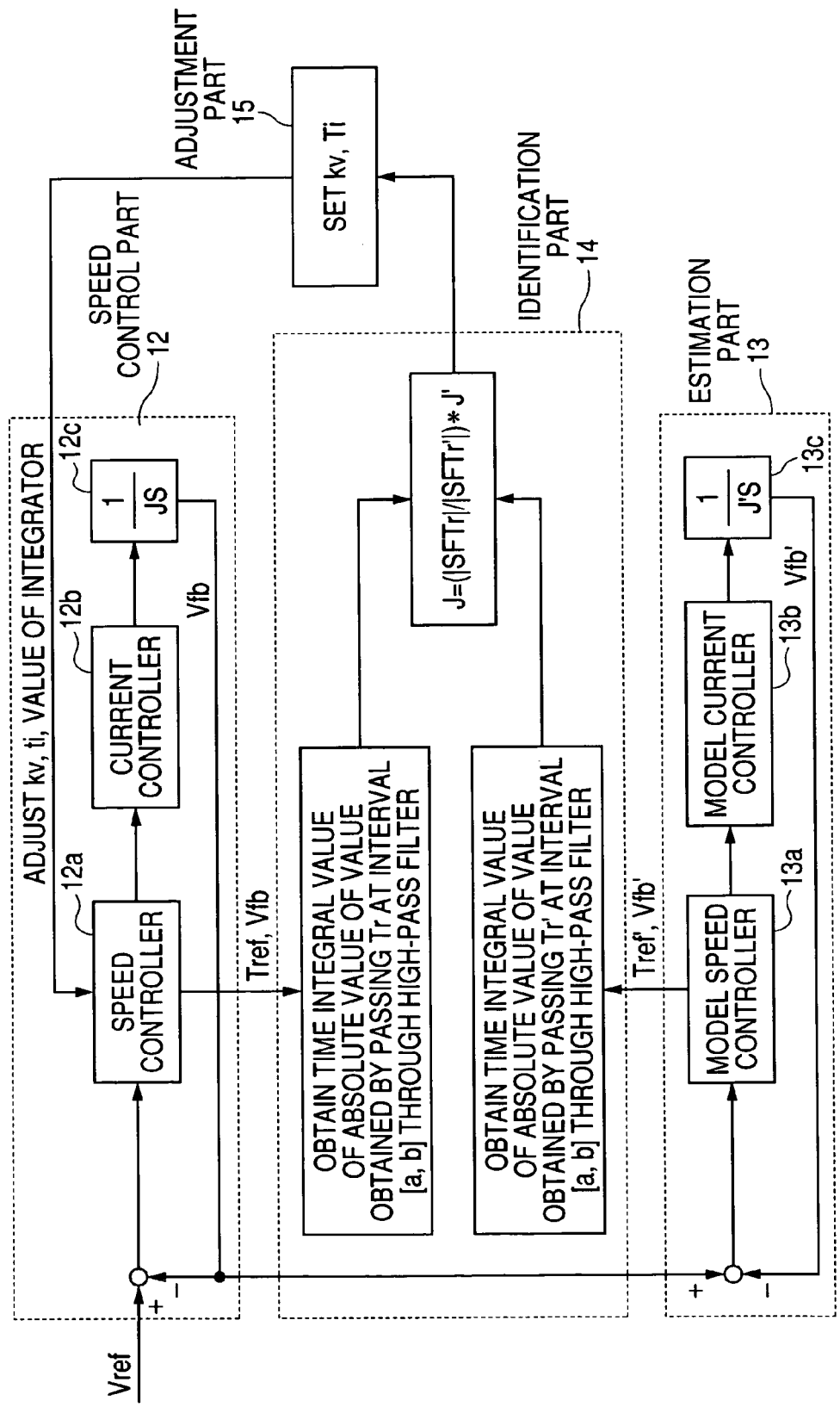
FIG. 2 is a block diagram showing details of a speed control part, an estimation part, an identification part and an adjustment part in FIG. 1.

FIG. 2 is a diagram showing a configuration of each the part of the speed control part 12, the estimation part 13, the identification part 14 and the adjustment part 15 in more detail.

When a speed command Vref is inputted from the command generation part 11, the speed control part 12 performs predetermined speed control by a speed controller 12a and a current controller 12b shown in the drawing so that an actual motor speed Vfb matches with this speed command Vref. Incidentally, it is assumed that a load JL is mounted in a motor and the actual motor speed Vfb is detected and outputted from the motor.

Here, in the speed controller of the present embodiment, a form of control may be any of PI (proportional integral) control and IP (integral proportional) control described above, and the speed controller 12a outputs a torque command to the current controller 12b for driving the motor.

Figure 3:
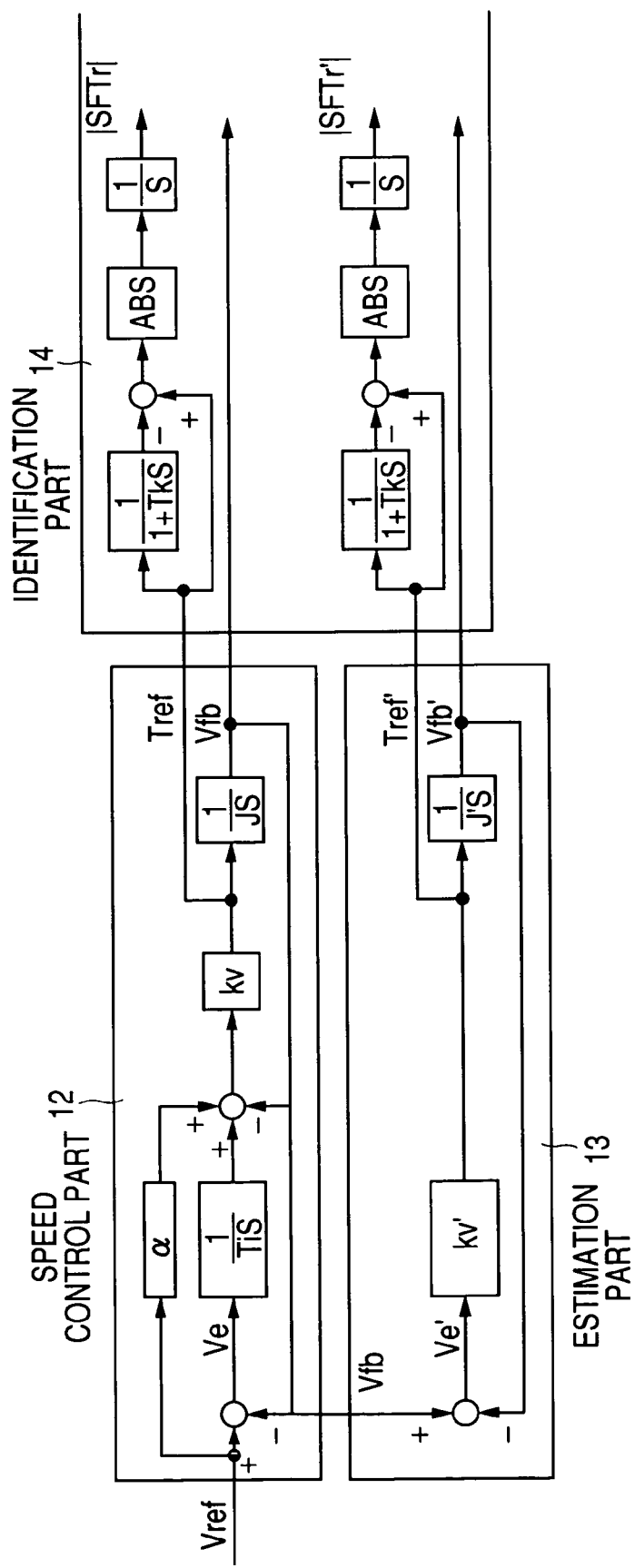
FIG. 3 is a block diagram showing more details of the speed control part and the estimation part in FIG. 1.

That is, in FIG. 3 showing more details of the speed control part 12 and the estimation part 13, setting α of the speed control part 12 at 1 results in the PI control and setting α at 0 results in the IP control.

Then, as shown in FIG. 2, the speed control part 12 outputs the motor speed Vfb to the estimation part 13 and also outputs a torque command Tref and the motor speed Vfb to the identification part 14.

The estimation part 13 performs speed control so that a model speed Vfb' matches with the motor speed Vfb by a model speed controller 13a and a model current controller 13b shown in the drawing using the motor speed Vfb inputted from the inside of the speed control part 12 as a command. Incidentally, a control method of this model speed controller 13a may be the same as that of the speed controller 12a in the speed control part 12 or may be P (proportional) control.

The model speed controller 13a outputs a model torque command Tref' to the model current controller 13b, and a motor model 13c (1/J's) modeled is driven by this model current controller 13b. Incidentally, it is assumed that an inertia value J' of the motor model 13c is a known value and the model speed Vfb' is outputted from the motor model 13c. Then, the estimation part 13 outputs the model torque command Tref' and the model speed Vfb' to the identification part 14.

The identification part 14 inputs the torque command Tref and the speed Vfb outputted from the speed control part 12 and the model torque command Tref' and the model speed Vfb' outputted from the estimation part 13, and obtains absolute values of FTr and FTr' which are values obtained by passing the torque command Tref and the model torque command Tref' through a high-pass filter of a time constant Tk.

As shown in FIG. 3, this high-pass filter could be implemented by subtracting a value obtained by passing the torque command through a low-pass filter of a time constant Tk from the torque command Tref in the speed control part 12 previously, and the high-pass filter through which the model torque command is passed in the estimation part 13 could be implemented similarly.

Next, absolute values |FTr| and |FTr'| of each output from the high-pass filters are obtained and using the respective absolute values |FTr| or |FTr'|, time integrals are obtained at a predetermined interval [a, b] and from obtained time integral values |SFTr| and |SFTr'| and the inertia J' which is the known value of the estimation part, inertia J of the speed control part 12 can be computed by the following formula (1).

$$J=(|SFTr|/|SFTr'|) \times J' \quad (1)$$

Here, an inertia identification principle will be described briefly.

In order to accurately obtain inertia from respective time integrals of a torque command or a motor current, when a transfer function from the torque command or the motor current to a speed is expressed by only the inertia and the speed is not zero, the inertia can be obtained simply from a ratio between the speed and the respective time integral values of the torque command or the motor current.

Using this relation, the same speed command is inputted to the actual speed control part 12 and its model and in a state in which a model speed matches with a motor speed at a value other than zero, the inertia can be obtained from the speed and the time integral values of the torque command or the motor current in its state.

However, a disturbance compensation component such as a torque ripple or friction in a mechanical portion in addition to a command response component is included in the torque command or the motor current, so that these influences are accumulated in an integrator of the speed controller.

Because of this, it is constructed so as to pass a signal of the torque command or the motor current through a high-pass filter in order to eliminate this compensation component accumulated. Therefore, it is desirable to set a time constant of the high-pass filter at the same value as an integral time constant of the speed control part 12.

Referring to this respect below, for example, when there is constant disturbance torque Fd, in the case of the speed control part 12 with P control, as the speed deviation E(∞) is given in the following formula, a constant speed deviation is caused by a theorem of the final value.

$$E(\infty) = \lim_{s \to 0} sE(s) = \lim_{s \to 0} s \frac{1}{Js+k_v} \frac{F_d}{s} = \frac{F_d}{k_v}$$

On the other hand, in the case of the speed control part 12 with PI control, as the speed deviation E(∞) is given in the following formula similarly, a speed deviation is not caused.

$$E(\infty) = \lim_{s \to 0} sE(s) = \lim_{s \to 0} s \frac{T_i s}{JT_i s^2 + k_v T_i s + k_v} \frac{F_d}{s} = 0$$

That is, the constant disturbance Fd is compensated by an integrator of the speed control part 12 and the compensation amount is outputted from the speed control part 12 as a torque command.

Since torque of this compensation amount is not torque necessary to operate only inertia, it is necessary to eliminate the torque in the case of identifying the inertia. Therefore, in this embodiment, it is constructed so that in order to eliminate the constant disturbance torque compensated by this integrator, the torque is passed through the high-pass filter and its time constant is made equal to an integral time constant and thereby disturbance torque (such as viscous friction other than the constant disturbance) transiently compensated by the integrator can also be canceled.

Also, a motor speed is set as a speed command of the estimation part 13 so as to satisfy a condition that a model speed mutually matches with the motor speed at a value other than zero as much as possible.

On the other hand, based on a value obtained by passing a ratio J/J' of inertia obtained in the identification part 14 through a predetermined filter, the adjustment part 15 updates an integral time constant Ti and a proportional gain Kv in the speed control part 12 and also adjusts a value of the integrator 12c in the speed control part 12 so that a torque command does not become discontinuous.

Figure 4:
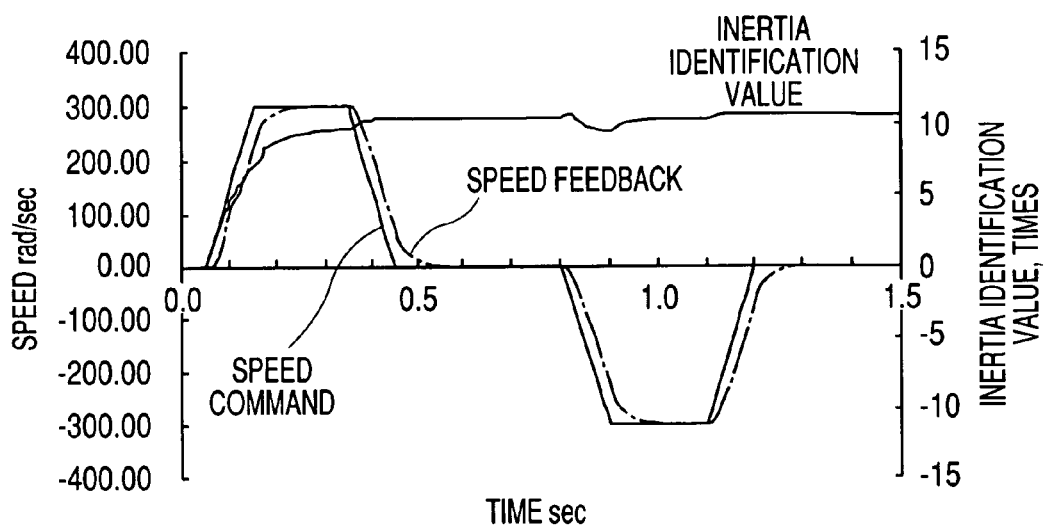
FIG. 4 is a diagram showing a simulation result in which one example to which the invention is applied is implemented.
Figure 5:
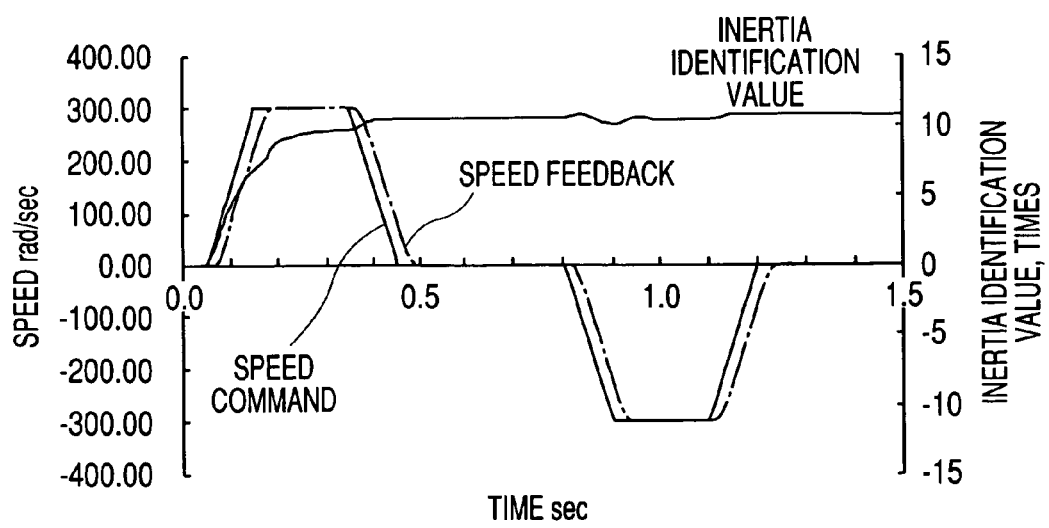
FIG. 5 is a diagram showing a simulation result according to a conventional art.

Next, simulation results using the embodiment are shown in FIGS. 4 and 5.

FIG. 4 is the case of constructing the speed control part 12 by PI control, and is a simulation result in which load inertia is ten times motor inertia (Jm=0.000019 kgm$^2$) and a dynamical system is modeled by a two-inertia system and a resonance frequency is 270 Hz and an antiresonance frequency is 80 Hz and a viscous friction constant is 0.00005 Nms/rad and 0.005 Nm is set as constant disturbance. Incidentally, model inertia J' is set at a value equal to that of the motor inertia Jm and an inertia identification value is passed through a low-pass filter of a time constant of 50 ms in the adjustment part 16.

As is evident from the drawing, after a lapse of 350 ms since tuning is started, an inertia identification value J is identified at 11.0 times the model inertia J' and as a result of correcting a value of an integrator, Kv, Ti in the speed control part 12 based on this identification value, it is found that very smooth and stable response to a speed command can be achieved.

Also, FIG. 5 is the case of constructing the speed control part 12 by IP control, and other conditions are equal to those of the case of the PI control of FIG. 4. As is evident from the drawing, even in the case of being constructed by the IP control, it is found that tuning can be performed accurately in a manner similar to the case of being constructed by the PI control.

Figure 6:
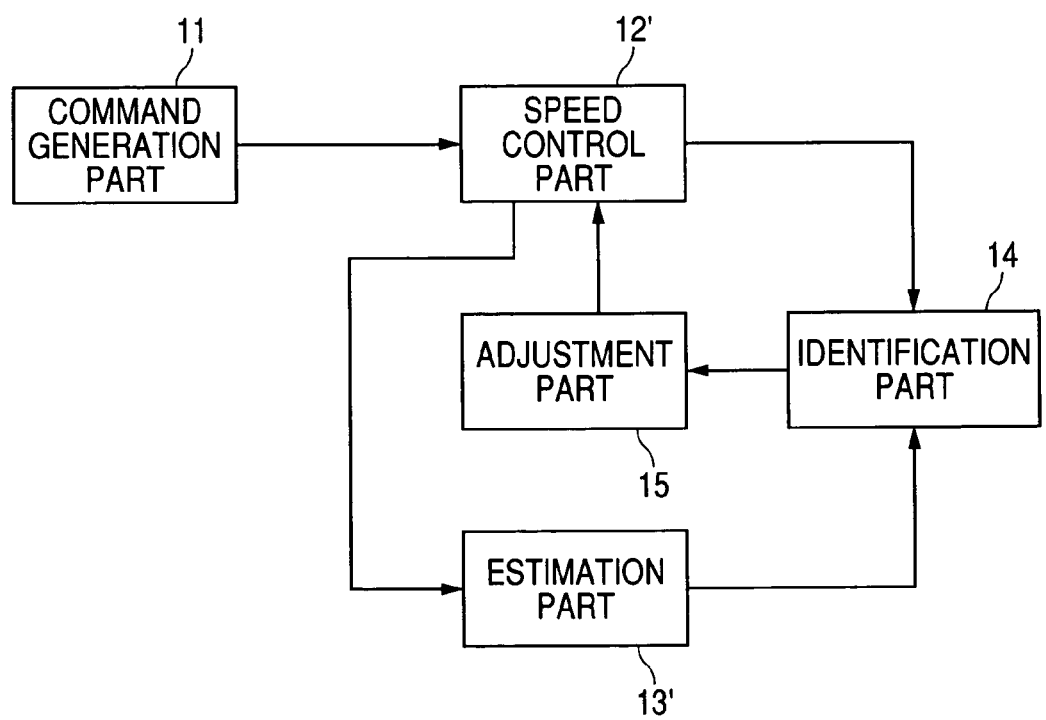
FIG. 6 is a block diagram of a motor control system to which the invention is applied.

Referring to FIG. 6, a control constant adjusting apparatus of a second embodiment of the invention only differs from the control constant adjusting apparatus of the first embodiment shown in FIG. 1 in a part of processing of a speed control part 12' and an estimation part 13', and the others are equal to the control constant adjusting apparatus of the first embodiment.

The speed control part 12' performs speed control so that a motor speed Vfb matches with a speed command Vref inputted, and outputs a torque command Tref and the motor speed Vfb to an identification part 14, and also outputs the motor speed Vfb and a feedforward signal FFa to the estimation part 13'.

The estimation part 13' inputs the motor speed Vfb and the feedforward signal FFa, and performs speed control so that a model speed Vfb' estimated by using a motor model in this estimation part 13' matches with the motor speed Vfb inputted as a target command, and outputs a model torque command Tref' and the model speed Vfb' to the identification part 14.

Figure 7:
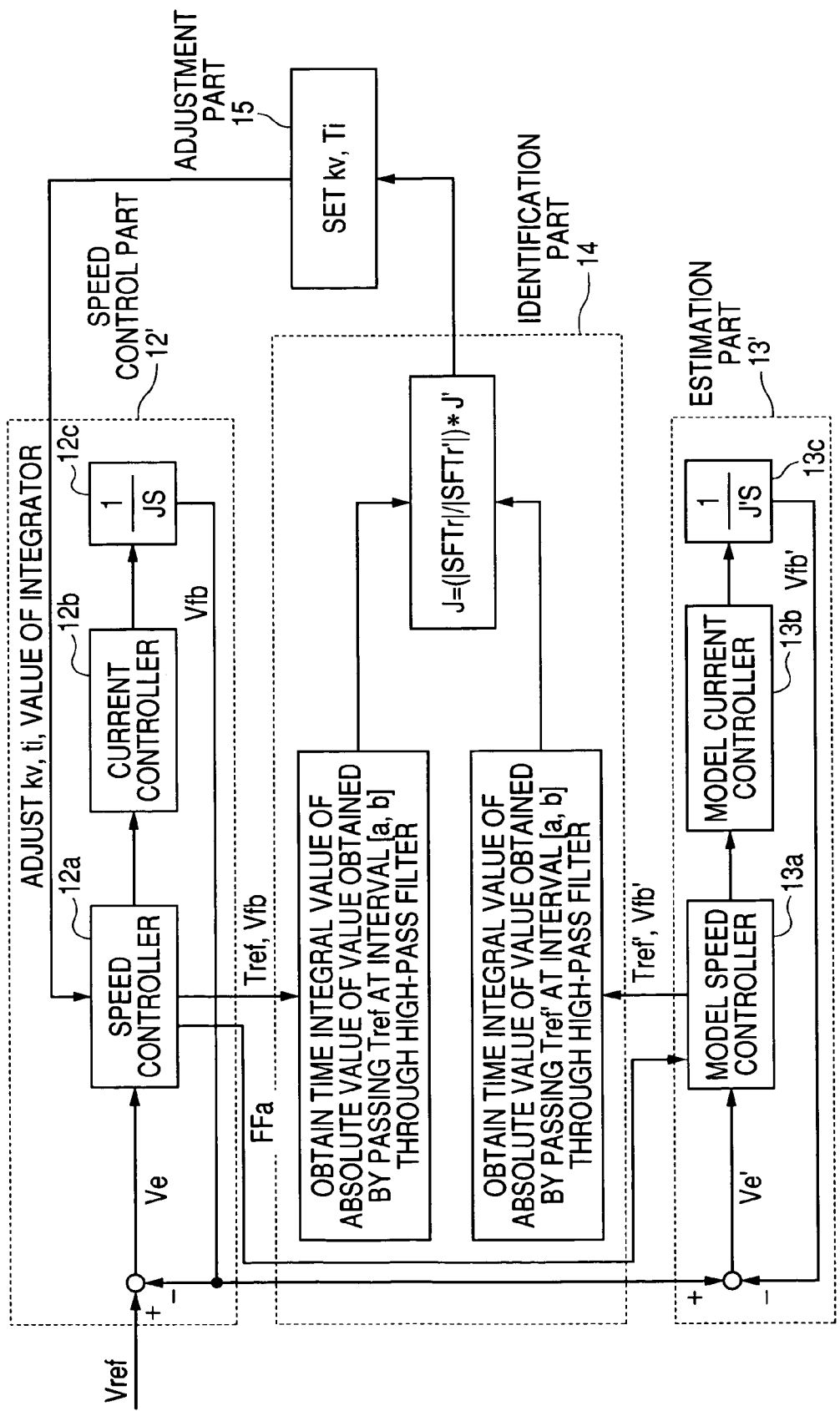
FIG. 7 is a block diagram showing details of a speed control part, an estimation part, an identification part and an adjustment part.

Next, FIG. 7 describes a configuration of each the part of the speed control part 12', the estimation part 13', the identification part 14 and an adjustment part 15 in more detail.

When a speed command Vref is inputted from a command generation part 11, the speed control part 12' performs predetermined speed control by a speed controller 12a and a current controller 12b shown in the drawing so that an actual motor speed Vfb matches with this speed command Vref. Incidentally, it is assumed that a load JL is mounted in a motor and the actual motor speed Vfb is detected and outputted from the motor.

Here, in a control method by the speed control part 12' of the present embodiment, a form of control may be any of PI (proportional integral) control and IP (integral proportional) control described above, and the speed control 12a outputs a torque command to the current controller 12b for driving the motor.

Figure 8:
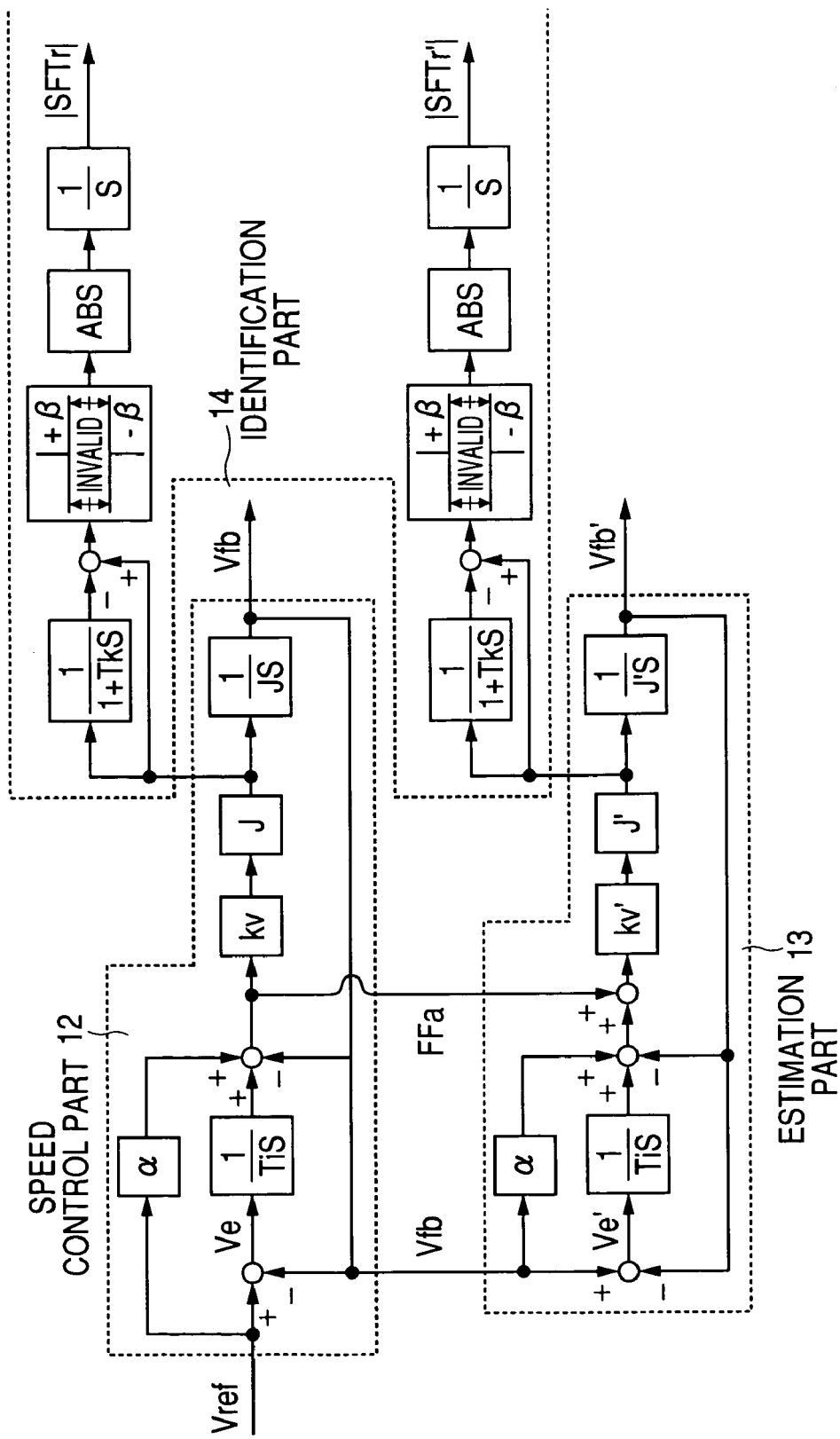
FIG. 8 is a block diagram showing more details of the speed control part and the estimation part.

That is, more details of the speed control part 12' and the estimation part 13' are shown in FIG. 8 and in the drawing, setting α of the speed control part 12' and the estimation part 13' at 1 results in the PI control and setting α at 0 results in the IP control.

Then, as shown in FIG. 7, the speed control part 12' outputs the motor speed Vfb and the feedforward signal FFa to the estimation part 13 and also outputs a torque command Tref and the motor speed Vfb to the identification part 14.

The estimation part 13' inputs the motor speed Vfb and the feedforward signal FFa from the inside of the speed control part 12' and uses the motor speed Vfb as a command and performs speed control so that a model speed Vfb' matches with the motor speed Vfb by a model speed controller 13a and a current controller 13b shown in the drawing.

The model speed controller 13a outputs a model torque command Tref' to the model current controller 13b, and a motor model 13c (1/J's) modeled is driven by this model current controller 13b. Here, it is assumed that an inertia value J' of the motor model 13c is a known value and the model speed Vfb' is outputted from the motor model 13c. Then, the estimation part 13' outputs the model torque command and the model speed Vfb' to the identification part 14. Incidentally, it is desirable that an integral time constant Ti' and a proportional gain Kv' in the model speed controller 13a have the same values as an integral time constant Ti and a proportional gain Kv in the speed controller 12.

The identification part 14 inputs the torque command Tref and the speed Vfb outputted from the speed control part 12' and the model torque command Tref' and the model speed Vfb' outputted from the estimation part 13', and obtains absolute values of FTr and FTr' which are values obtained by passing the torque command Tref and the model torque command Tref' through a high-pass filter of a time constant Tk.

As shown in FIG. 8, this high-pass filter could be implemented by subtracting a value obtained by passing the torque command through a low-pass filter of a time constant Tk from the torque command Tref in the speed control part 12' previously, and the high-pass filter through which the model torque command is passed in the estimation part 13' could be implemented similarly.

Next, absolute values |FTr| and |FTr'| of each output from the high-pass filters are obtained and using the respective absolute values |FTr| or |FTr'|, time integrals are obtained at a predetermined interval [a, b] and inertia J of the speed control part 12' can be computed from obtained time integral values |SFTr| and |SFTr'| and inertia J' which is the known value of the estimation part 13'.

The present embodiment is constructed so that a speed proportional integral term in the speed control part 12' is inputted to the estimation part 13' as a feedforward signal and thereby an influence of a disturbance component which cannot be eliminated by the high-pass filter can be suppressed and also the model speed tends to match with the motor speed easier than the conventional art by inputting the feedforward signal.

Figure 9:
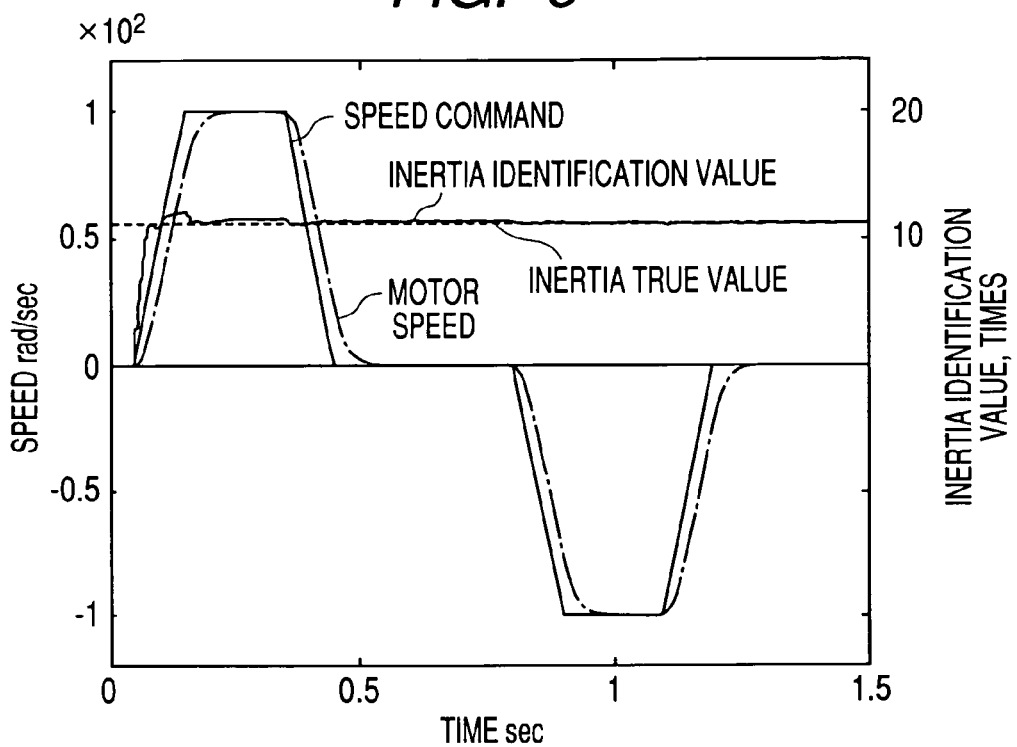
FIG. 9 is a diagram showing a simulation result in which the invention is implemented by PI control.
Figure 10:
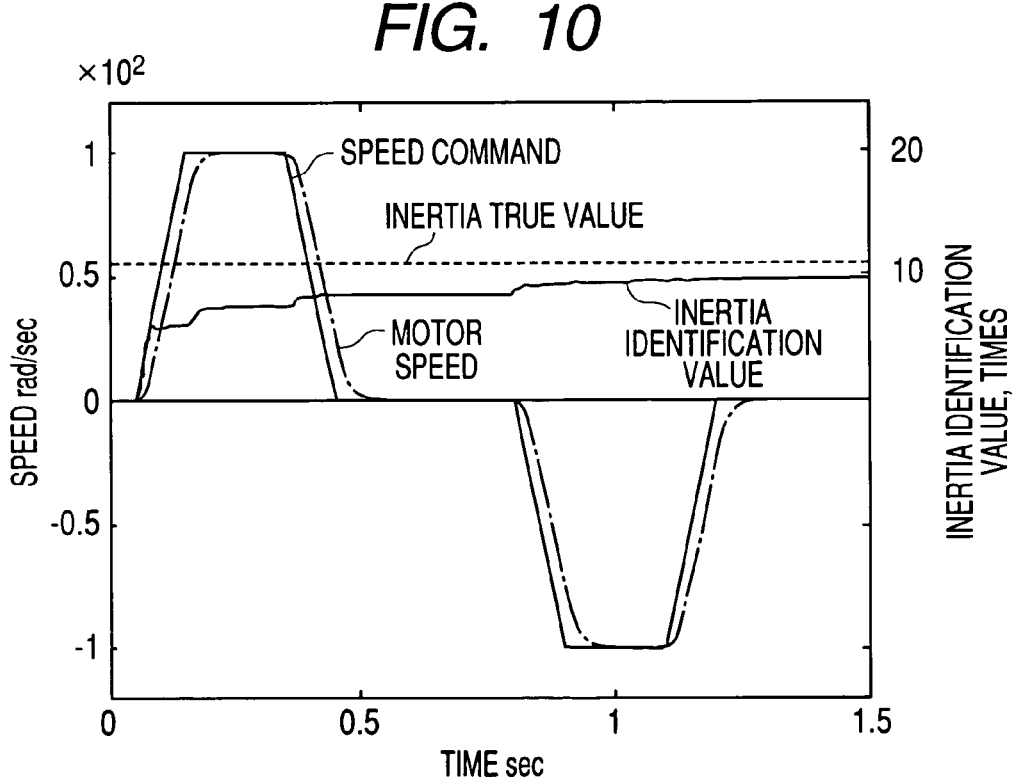
FIG. 10 is a diagram showing a simulation result in which the invention is implemented by IP control.

Next, simulation results using the embodiment are shown in FIGS. 9 and 10.

FIG. 9 is the case of applying the invention, and is a simulation result in which load inertia is ten times motor inertia (Jm=0.000019 kgm$^2$) and a dynamical system is modeled by a two-inertia system and a resonance frequency is 270 Hz and an antiresonance frequency is 80 Hz and a viscous friction constant is 0.00005 Nms/rad and 0.005 Nm is set as constant disturbance. Here, model inertia J' is set at a value equal to that of the motor inertia Jm and a threshold value β is set at zero. Also, an inertia identification value is passed through a low-pass filter of a time constant of 10 ms in the adjustment part 15. Incidentally, the threshold value could be set in the case of desiring to eliminate minute vibration of a high frequency at the time of servo locking.

As is evident from the drawing, an inertia identification value J is identified at 11.0 times the model inertia J' within 50 ms after fixing is started and as a result of correcting a value of an integrator 12c, Kv, Ti in the speed control part 12 based on this identification value, it is found that very smooth and stable response to a speed command can be achieved.

On the other hand, FIG. 10 is the case of applying the conventional art, and other conditions are equal to those of the case of FIG. 9. As is evident from the drawing, in the case that the feedforward signal which is a feature of the present method is not inputted, it is found that time taken to reach a true value of an identification value is long and an identification error is caused even after 1.5 seconds.

The invention claimed is:

1. A control constant adjusting apparatus comprising:
    a command generation member for outputting a speed command Vref,
    a speed control member for determining a torque command (Tref) so that an actual motor speed (Vfb) matches with the speed command (Vref) and controlling the motor speed by the torque command,
    an estimation member for simulating the speed control member so that a speed (Vfb') of a model matches with the motor speed (Vfb),
    an identification member for making identification of inertia (J) obtained from a ratio between a value (|SFTr|)

in which an absolute value (|FTr|) of a value (FTr) obtained by passing the torque command (Tref) of the speed control member through a predetermined high-pass filter is integrated with respect to time at a predetermined interval ([a, b]) and a value (|SFTr'|) in which an absolute value (|FTr'|) of a value (FTr') obtained by passing a model torque command (Tref') of the estimation member through a predetermined high-pass filter is integrated with respect to time at the same interval only when the speed Vfb' of the model in the estimation member matches with the motor speed (Vfb) in the speed control member at a value other than zero, and an adjustment member for adjusting a control gain based on a ratio (J/J') between the inertia (J) identified in the identification member and inertia (J') in the estimation member.

2. The apparatus as claimed in claim 1, wherein the estimation member is constructed so that the model speed matches with the speed by setting a speed controller of the estimation member at proportional control and setting a speed loop gain which is a proportional gain at X (where X is an integer of one or more) times a speed loop gain in the speed control member.

3. The apparatus as claimed in claim 1, wherein a time constant of the high-pass filter through which the torque command Tref and the model torque command Tref' are passed is a speed integral time constant in the speed control member.

4. A control constant adjusting apparatus comprising:
a command generation member for outputting a speed command (Vref),
a speed control member for inputting the speed command (Vref) and an actual motor speed (Vfb) and calculating a speed deviation (Ve) by subtracting the actual motor speed (Vfb) from the speed command (Vref) and calculating a speed proportional integral value by adding an integral term for calculating a speed integral value by integrating the speed deviation (Ve) with respect to an integral time constant (Ti) to a proportional term for calculating a speed proportional value by subtracting the motor speed (Vfb) from a value in which the speed command (Vref) is multiplied by a predetermined constant $\alpha$ ($\alpha \geq 0$) and determining a torque command (Tref) by multiplying the speed proportional integral value by an inertia estimation value (J) for estimating a total value of a motor inertia value (Jm) and a load inertia value (JL) and controlling the motor speed by the torque command, an estimation member for simulating the speed control member so that a speed (Vfb') of a model matches with the motor speed (Vfb), an identification member for providing a feedforward compensation function for adding the speed proportional integral value in the speed control member to a model speed proportional integral value similarly computed in the estimation member and setting the speed proportional integral value to a new model speed proportional integral value, and making identification of inertia (J) obtained from a ratio between a value (|SFTr|) in which an absolute value (|FTr|) of a value (FTr) obtained by passing the torque command (Tref) of the speed control member through a predetermined high-pass filter is integrated with respect to time at a predetermined interval ([a, b]) and a value (|SFTr'|) in which an absolute value (|FTr'|) of a value (FTr') obtained by passing a model torque command (Tref') of the estimation member through a predetermined high-pass filter is integrated with respect to time at the same interval, and an adjustment member for adjusting a control gain based on a ratio (J/J') between the inertia estimation value (J) identified in the identification member and inertia (J') in the estimation member.

5. The apparatus as claimed in claim 4, wherein a model speed controller of the estimation member includes the same control configuration as that of a speed controller of the speed control member, and an integral time constant and a speed loop gain in the model speed controller are equal to an integral time constant and a speed loop gain in the speed control member.

6. The apparatus as claimed in claim 4, wherein in a case of summing absolute values of the torque command and the model torque command, the summation is performed when the absolute value (|FTr|) of the torque command after being passed through the high-pass filter and the absolute value (|FTr'|) of the model torque command after being passed through the high-pass filter exceed a preset threshold value ($\beta$).

* * * * *